(12) United States Patent
Griffin

(10) Patent No.: US 8,395,584 B2
(45) Date of Patent: Mar. 12, 2013

(54) MOBILE TERMINALS INCLUDING MULTIPLE USER INTERFACES ON DIFFERENT FACES THEREOF CONFIGURED TO BE USED IN TANDEM AND RELATED METHODS OF OPERATION

(75) Inventor: Jeffrey Jason Griffin, Raleigh, NC (US)

(73) Assignees: Sony Corporation, Lund (SE); Sony Mobile Communications AB, Lund (SE)

( * ) Notice: Subject to any disclaimer, the term of this patent is extended or adjusted under 35 U.S.C. 154(b) by 911 days.

(21) Appl. No.: 12/017,789

(22) Filed: Jan. 22, 2008

(65) Prior Publication Data

US 2009/0167696 A1 Jul. 2, 2009

Related U.S. Application Data

(60) Provisional application No. 61/018,094, filed on Dec. 31, 2007.

(51) Int. Cl.
*G09G 5/00* (2006.01)
*G06F 3/041* (2006.01)

(52) U.S. Cl. ........................... 345/169; 345/173

(58) Field of Classification Search ........... 345/168–178
See application file for complete search history.

(56) References Cited

U.S. PATENT DOCUMENTS

| | | | |
|---|---|---|---|
| 6,331,840 B1 | 12/2001 | Nielson et al. | |
| 7,009,599 B2 * | 3/2006 | Pihlaja | 345/173 |
| 7,088,342 B2 * | 8/2006 | Rekimoto et al. | 345/169 |
| 7,289,829 B2 | 10/2007 | Ormson et al. | |
| 7,800,592 B2 * | 9/2010 | Kerr et al. | 345/173 |
| 2002/0018051 A1 * | 2/2002 | Singh | 345/173 |
| 2005/0012723 A1 * | 1/2005 | Pallakoff | 345/173 |
| 2007/0205990 A1 | 9/2007 | Gloyd et al. | |
| 2007/0268264 A1 | 11/2007 | Aarras et al. | |

FOREIGN PATENT DOCUMENTS

| | | |
|---|---|---|
| EP | 1 111 878 A2 | 6/2001 |
| EP | 1 111 878 A3 | 6/2001 |
| EP | 1 257 111 A | 11/2002 |

OTHER PUBLICATIONS

International Search Report and Written Opinion (12 pages) corresponding to International Application No. PCT/US2008/008322; Mailing Date: Oct. 7, 2008.

* cited by examiner

*Primary Examiner* — Jimmy H Nguyen
(74) *Attorney, Agent, or Firm* — Myers Bigel Sibley & Sajovec, P.A.

(57) ABSTRACT

A mobile terminal includes a housing, a first user interface located on a first face of the housing, a second user interface located on a second face of the housing different from the first face, and a controller within the housing and coupled to the first and second user interfaces. The second user interface includes a touch sensor configured to be used in tandem with the first user interface. The second user interface is positioned on the housing relative to the first user interface such that, when the mobile terminal is held in the user's hand, the first user interface is operable by a thumb and the second user interface is operable by a finger of the same hand. The first user interface is configured to receive a first user input, and the second user interface is configured to receive a second user input. The controller is configured to detect a combination of the received first and second user inputs, and is configured to perform a mobile terminal function associated with the detected combination responsive to detection of the combination. Related user interfaces and methods of operation are also discussed.

14 Claims, 5 Drawing Sheets

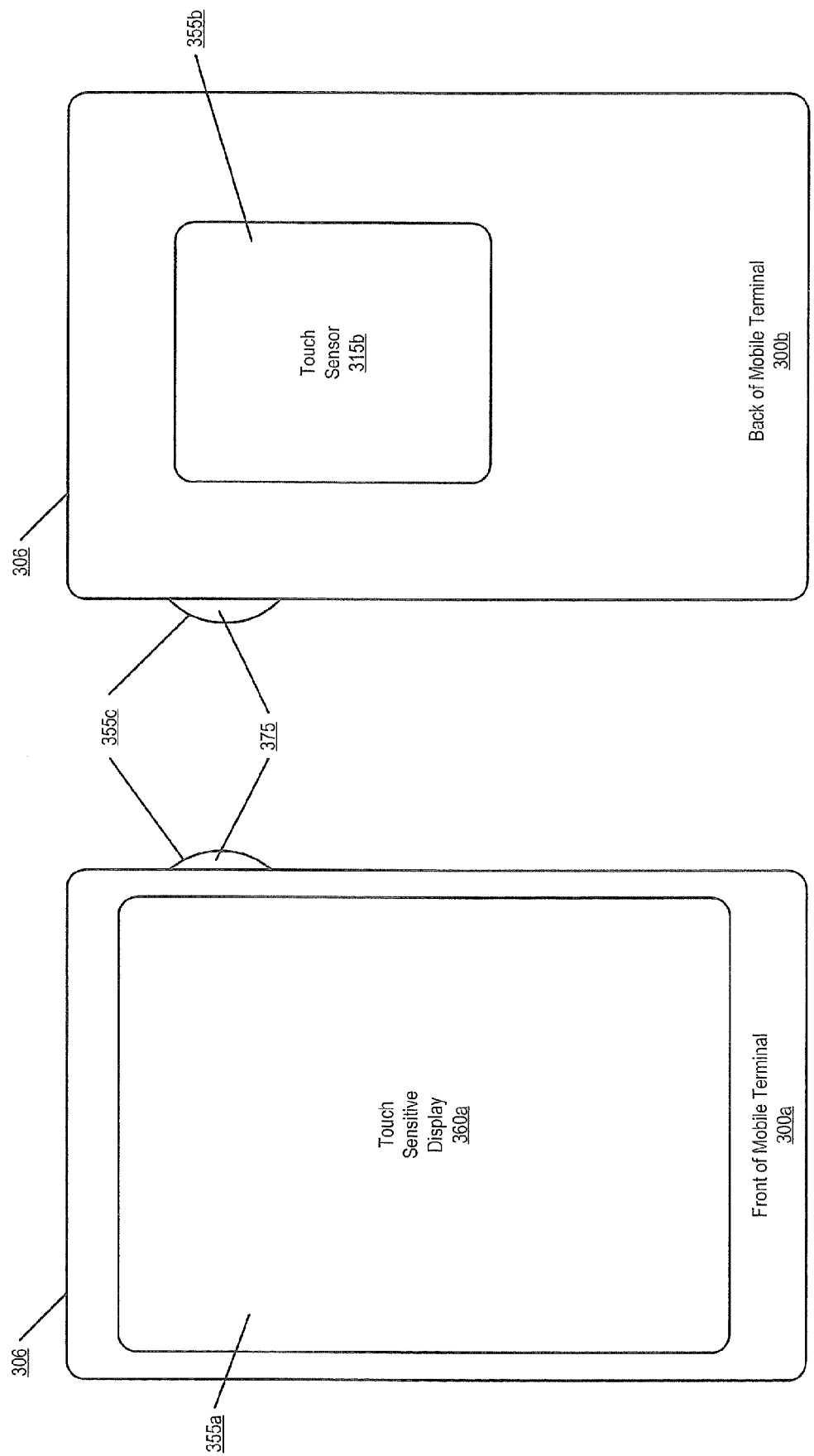

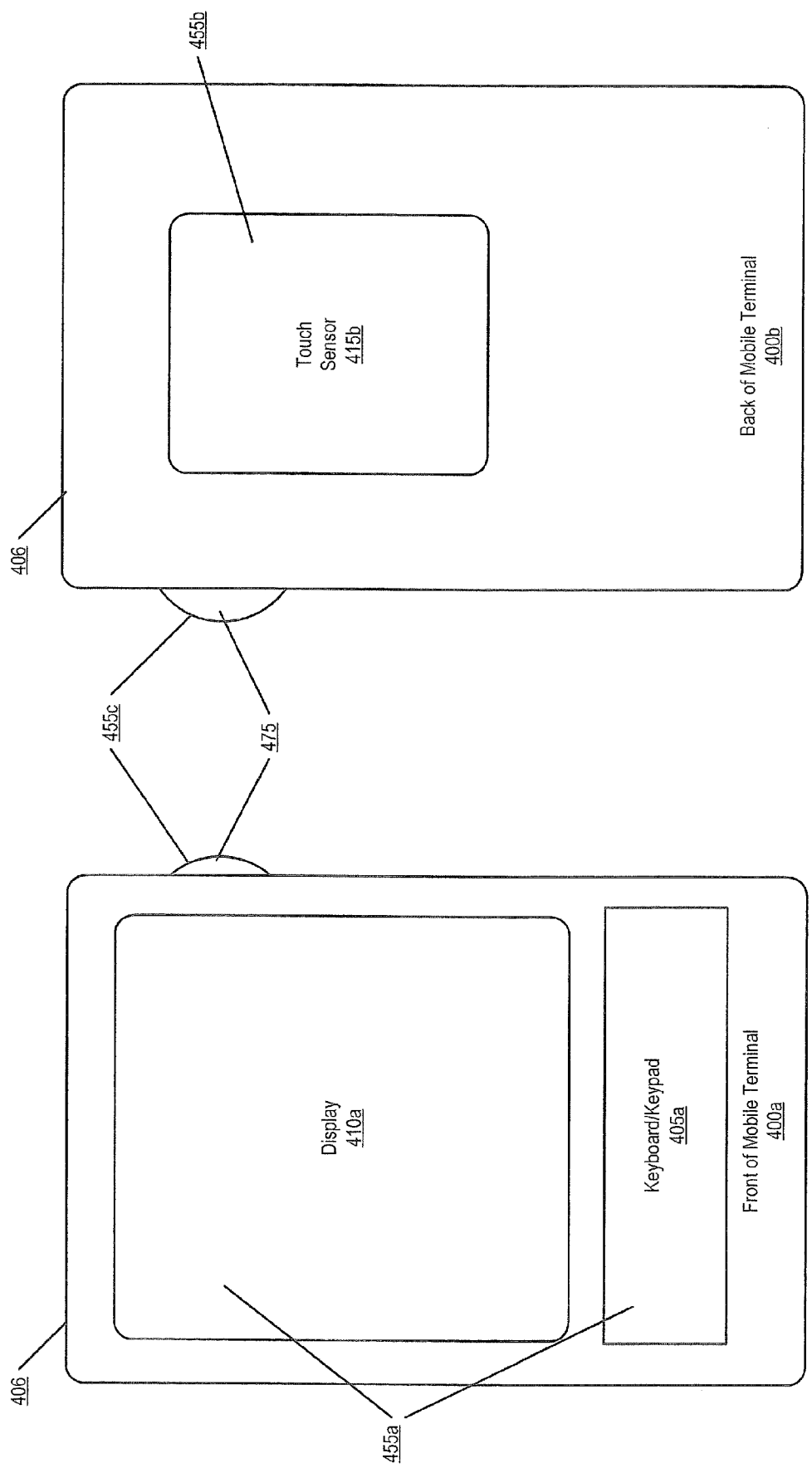

MOBILE TERMINALS INCLUDING MULTIPLE USER INTERFACES ON DIFFERENT FACES THEREOF CONFIGURED TO BE USED IN TANDEM AND RELATED METHODS OF OPERATION

CROSS-REFERENCE TO RELATED PATENT APPLICATIONS

This application claims priority from U.S. Provisional Application Ser. No. 61/018,094 filed Dec. 31, 2007, the disclosure of which is hereby incorporated by reference herein in its entirety.

FIELD OF THE INVENTION

The present invention relates to mobile terminals and methods of operating the same.

BACKGROUND OF THE INVENTION

Portable electronic devices, such as mobile terminals, increasingly provide a variety of communications, multimedia, and/or data processing capabilities. For example, mobile terminals, such as cellphones and personal digital assistants, may provide access to data in a wide variety of multimedia formats, including text, pictures, music, and/or video.

Text entry in mobile terminals may be difficult due to the limited input devices provided by mobile terminals. For example, while some computing devices, such as personal computers, may include a full QWERTY keyboard for alphanumeric text entry, some mobile terminals may be equipped with limited keyboards, where one key can represent more than one alphanumeric character. One such system, known as multi-tap, typically allows users to enter text using a conventional telephone key pad by pressing a key a varying number of times to cycle through several alphanumeric characters associated with the particular key.

New sensing technologies have been developed that may alter the way a user interacts with mobile terminals and/or other handheld electronic devices. For example, touch sensitive hardware, such as capacitance-sensing touch sensors, can sense the size and motion of various touch-based user inputs. Many conventional portable devices may employ such touch sensors as an overlay on top of a liquid crystal display (LCD) screen. For example, Apple's iPhone® includes a capacitance-based touch sensor that can sense single-touch and multi-touch user inputs, and as such, uses only a single physical button in its user interface, which typically functions as a "home" button to bring up the main menu.

SUMMARY OF THE INVENTION

According to some embodiments of the present invention, a mobile terminal includes a housing sized and configured to be held in a user's hand, a first user interface located on a first face of the housing and configured to receive a first user input, a second user interface located on a second face of the housing different from the first face and configured to receive a second user input, and a controller within the housing coupled to the first and second user interfaces. The second user interface includes a touch sensor configured to be used in tandem with the first user interface. The second user interface is positioned on the housing relative to the first user interface such that, when the mobile terminal is held in the user's hand, the first user interface is operable by a thumb and the second user interface is operable by a finger of the same hand to enable one-handed operation of the mobile terminal. The controller is configured to detect a combination of the received first and second user inputs and perform a mobile terminal function associated with the detected combination responsive to detecting the combination.

In some embodiments, the second face may be a back of the mobile terminal housing configured to face away from a user during operation of the mobile terminal. Also, the first face may be a front of the mobile terminal housing opposite the back and configured to face toward the user during operation of the mobile terminal.

In other embodiments, the second user interface may be a secondary interface. The controller may be configured to only perform mobile terminal functions responsive to detecting a combination including the first user input.

In some embodiments, the controller may be configured to detect the combination based on first and second user inputs that are received substantially concurrently via the first and second user interfaces, respectively.

In other embodiments, the first user interface may be a keypad configured to detect depression of a button thereof as the first user input.

In some embodiments, the first user interface may be a second touch sensor configured to detect at least one touch and/or direction of motion thereon as the first user input.

In other embodiments, the first and/or second user interfaces may be respectively configured to receive multiple directional inputs and/or multiple touch inputs as the first and/or second user inputs.

In some embodiments, the controller may be configured to capture a predetermined character and/or symbol, launch a program, dial a phone number, navigate a menu, move a cursor, and/or change a setting of the mobile terminal and/or an application thereof associated with the detected combination responsive to detecting the combination.

In other embodiments, the first user interface may include at least one physical and/or virtual button thereon including at least two alphanumeric characters and/or symbols associated therewith. The controller may be configured to enter a first one of the associated characters and/or symbols responsive to detecting activation of the button on the first user interface as the first user input. The controller may be further configured to enter a second one of the associated characters and/or symbols responsive to detecting activation of the button on the first user interface as the first user input in combination with detecting at least one touch and/or direction of motion on the second user interface as the second user input.

In some embodiments, the button may include at least three alphanumeric characters and/or symbols associated therewith. The controller may be configured to enter the second one of the associated characters and/or symbols responsive to detecting activation of the button on the first user interface as the first user input in combination with detecting a first direction of motion in on the second user interface as the second user input. The controller may be further configured to enter a third one of the associated characters and/or symbols responsive to detecting activation of the button on the first user interface as the first user input in combination with detecting a second direction of motion different from the first direction on the second user interface as the second user input.

In other embodiments, the controller may be configured to determine a handedness of the user and perform the function responsive to detection of a different combination of the first and second user inputs based on the handedness of the user.

According to further embodiments of the present invention, a method of operating a handheld mobile terminal includes receiving a first user input via a first user interface located on a first face of a mobile terminal housing, and receiving a second user input via a second user interface located on a second face of the mobile terminal housing different from the first face. The second user interface includes a touch sensor configured to be used in tandem with the first user interface. The second user interface is positioned on the housing relative to the first user interface such that, when the mobile terminal is held in the user's hand, the first user interface is operable by a thumb and the second user interface is operable by a finger of the same hand to enable one-handed operation of the mobile terminal. A combination of the received first and second user inputs is detected, and a mobile terminal function associated with the detected combination is performed responsive to detecting the combination.

In some embodiments, when the mobile terminal is held in the user's hand, the first user interface may be operated with a thumb of the user's hand to provide the first user input, and the second user interface may be operated with a finger of the same hand to provide the second user input and to enable one-handed operation of the mobile terminal. For example, the second face may be a back of the mobile terminal housing configured to face away from a user during mobile terminal operation. Also, the first face may be a front of the mobile terminal housing opposite the back and configured to face toward the user during mobile terminal operation.

In other embodiments, no mobile terminal functions may be performed responsive to receiving the second user input without receiving the first user input.

In some embodiments, the combination of the first and second user inputs may be detected responsive to receiving the first and second user inputs substantially concurrently via the first and second user interfaces, respectively.

In other embodiments, the first user interface may be a second touch sensor, and at least one touch and/or direction of motion may be received on the first user interface as the first user input.

In some embodiments, the first user interface may include at least one physical and/or virtual button thereon including at least two alphanumeric characters and/or symbols associated therewith. A first one of the associated characters and/or symbols may be entered responsive to detecting activation of the button on the first user interface as the first user input. A second one of the associated characters and/or symbols may be entered responsive to detecting activation of the button on the first user interface as the first user input in combination with detecting at least one touch and/or direction of motion on the second user interface as the second user input.

In other embodiments, the button may include at least three alphanumeric characters and/or symbols associated therewith. The second one of the associated characters and/or symbols may be entered responsive to detecting activation of the button on the first user interface as the first user input in combination with detecting a first direction of motion on the second user interface as the second user input. A third one of the associated characters and/or symbols may be entered responsive to detecting activation of the button on the first user interface as the first user input in combination with detecting a second direction of motion different from the first direction on the second user interface as the second user input.

Although described above primarily with respect to method and electronic device aspects of the present invention, it will be understood that the present invention may be embodied as methods, electronic devices, and/or computer program products.

BRIEF DESCRIPTION OF THE DRAWINGS

FIGS. 3A-3B are schematic diagrams illustrating front and back views of a mobile terminal including multiple user interfaces in accordance with some embodiments of the present invention;

FIGS. 4A-4B are schematic diagrams illustrating front and back views of a mobile terminal including multiple user interfaces in accordance with other embodiments of the present invention.

DETAILED DESCRIPTION OF EMBODIMENTS OF THE INVENTION

Figure 1:
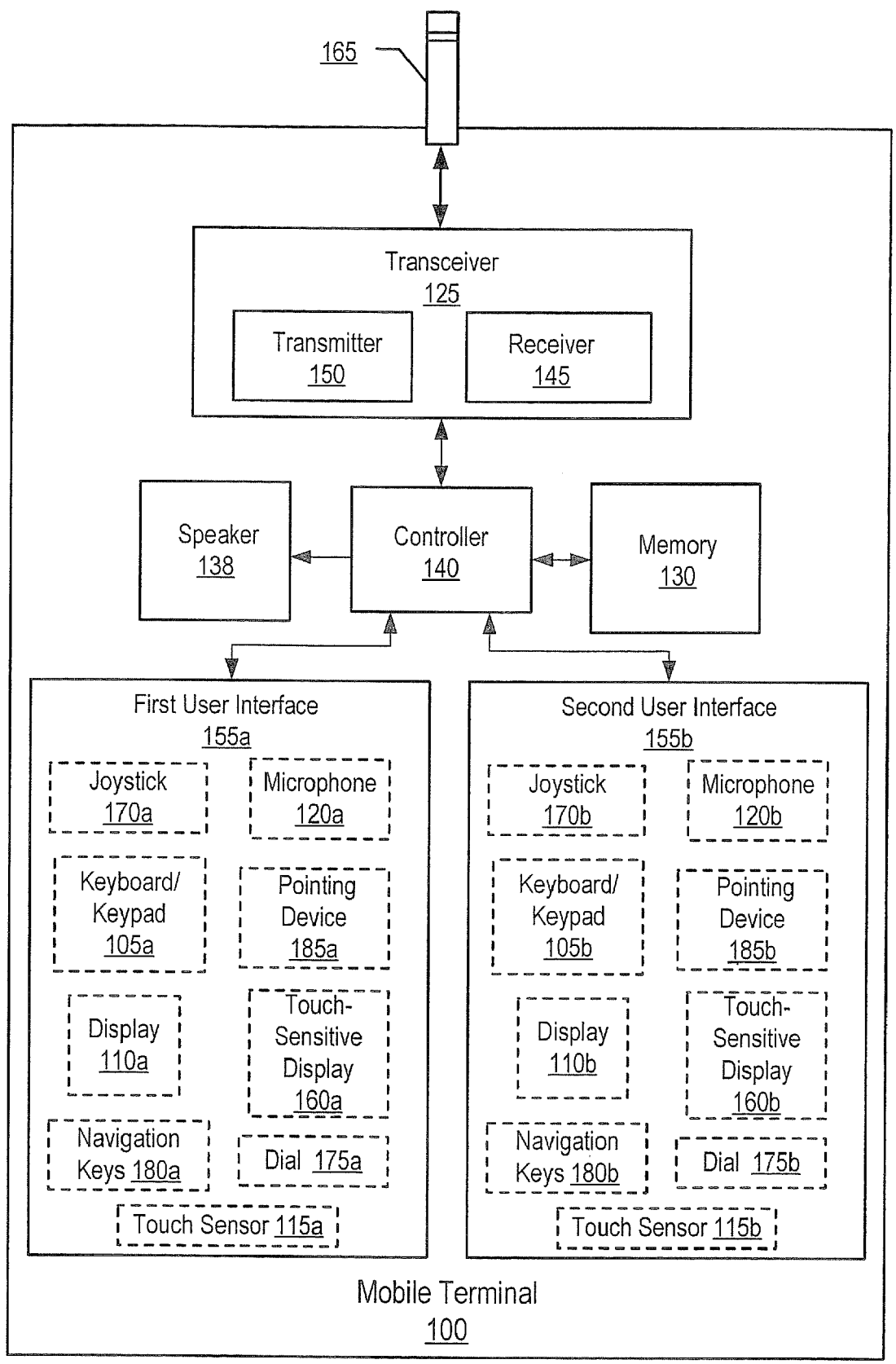
FIG. 1 is a block diagram illustrating a mobile terminal including multiple user interfaces in accordance with some embodiments of the present invention.

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. In contrast, when an element is referred to as being "directly coupled" or "directly connected" to another element, there are no intervening elements present. Furthermore, "connected" or "coupled" as used herein may include wirelessly connected or coupled. As used herein, the term "and/or" includes any and all combinations of one or more of the associated listed items, and may be abbreviated as "/".

It will also be understood that, although the terms first, second, etc. may be used herein to describe various elements, these elements should not be limited by these terms. These terms are only used to distinguish one element from another. For example, a first user interface could be termed a second user interface, and, similarly, a second user interface could be termed a first user interface without departing from the teachings of the disclosure.

As will be appreciated by one of skill in the art, the present invention may be embodied as methods, devices, and/or computer program products. Accordingly, the present invention may be embodied in hardware and/or in software (including firmware, resident software, micro-code, etc.). The program code may execute entirely on a single processor and/or across multiple processors, as a stand-alone software package or as part of another software package.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

For purposes of illustration, embodiments of the present invention are described herein in the context of a mobile terminal. It will be understood, however, that the present invention is not limited to such embodiments and may be embodied generally as any portable and/or handheld electronic device including multiple user interfaces configured to be used in tandem as described herein.

As used herein, a touch sensor may refer to an electronic input device, such as a touchscreen, that is configured to detect touch and/or motion-based user inputs on an area within which the sensor is bounded. As such, touch sensors as described herein do not encompass button, toggle, or other physical switch-type inputs. Although described herein primarily with reference to capacitance-based touch sensors, it is to be understood that some embodiments of the present invention may employ one or more other touch sensing technologies, such as resistance, surface acoustic wave (SAW), infrared, strain gauge, optical imaging, dispersive signal, acoustic pulse imaging, frustrated total internal reflection, and/or other touch sensing technologies.

Some embodiments of the present invention arise from a realization that mobile terminals including conventional touch sensor-based user interfaces typically require two-handed operation. More particularly, one hand may be used to hold the mobile terminal, while the other hand may be used to touch the user interface. In addition, as the 'buttons' on a touch sensor-based user interface may be tactilely indistinguishable, a user may be required to look at the device during text entry. Also, capacitance-based touch sensors may not be ideal for multi-tap text entry, as they may not accurately detect multiple touches in rapid succession. Conventional touch-sensor based user interfaces may thereby require more of the user's focus and/or attention than other types of user interfaces, which may be inconvenient for the user. Accordingly, some embodiments of the present invention provide mobile terminals including multiple user interfaces, one or more of which include a touch sensor, that are configured to be used in tandem to enable one-handed mobile terminal operation. For example, by building in a second touch sensor on the back side of a mobile terminal that includes a touch sensitive display on the front side, combinations of touches on the front and back of the mobile terminal can be used for character/symbol input and/or other mobile terminal functions. As such, mobile terminals including multiple user interfaces according to some embodiments of the present invention may be operated with less user attention, and as such, may offer greater convenience to the user.

FIG. 1 is a block diagram illustrating a mobile terminal in accordance with some embodiments of the present invention. Referring now to FIG. 1, an exemplary mobile terminal 100 includes a transceiver 125, memory 130, a speaker 138, a controller 140, a first user interface 155a, and a second user interface 155b. The transceiver 125 typically includes a transmitter circuit 150 and a receiver circuit 145 that cooperate to transmit and receive radio frequency signals to and from base station transceivers via an antenna 165. The radio frequency signals transmitted between the mobile terminal 100 and the base station transceivers may include both traffic and control signals (e.g. paging signals/messages for incoming calls), which are used to establish and maintain communication with another party or destination. The radio frequency signals may also include packet data information, such as, for example, cellular digital packet data (CDPD) information. In addition, the transceiver 125 may include an infrared (IR) transceiver configured to transmit/receive infrared signals to/from other electronic devices via an IR port.

The memory 130 may represent a hierarchy of memory that may include volatile and/or non-volatile memory, such as removable flash, magnetic, and/or optical rewritable non-volatile memory. The memory 130 may be configured to store several categories of software, such as an operating system, applications programs, and input/output (I/O) device drivers. The operating system may control the management and/or operation of system resources and may coordinate execution of programs by the controller 140. The I/O device drivers typically include software routines accessed through the operating system by the application programs to communicate with input/output devices, such as those included in the user interfaces 155a-155b, and/or other components of the memory 130.

The controller 140 is coupled to the transceiver 125, the memory 130, the speaker 138, and the user interfaces 155a-155b. The controller 140 may be, for example, a commercially available or custom microprocessor that is configured to coordinate and manage operations of the transceiver 125, the memory 130, the speaker 138, and/or the user interfaces 155a-155b.

As noted above, the mobile terminal 100 includes first and second user interfaces 155a and 155b. The first user interface 155a may include a microphone 120a, a display 110a (such as a liquid crystal display), a touch sensor 115a, a joystick 170a, a keyboard/keypad 105a, a touch-sensitive display 160a (which includes both a display and a touch sensor as an overlay on the display), a dial 175a, a directional navigation key(s) 180a, and/or a pointing device 185a (such as a mouse, trackball, touch pad, etc.). Likewise, the second user interface 155b may similarly include a microphone 120b, a display 110b (such as a liquid crystal display), a touch sensor 115b, a joystick 170b, a keyboard/keypad 105b, a touch-sensitive display 160b (which includes both a display and a touch sensor as an overlay on the display), a dial 175b, a directional navigation key(s) 180b, and/or a pointing device 185b (such as a mouse, trackball, touch pad, etc.). However, depending on functionalities offered by the mobile terminal 100, additional and/or fewer elements of the user interfaces 155a-155b may actually be provided. For instance, the touch-sensitive display 160a may functionally replace the display 110a, the touch sensor 115a, the keypad 105a, and/or the pointing device 185a of the first user interface 155a. More generally, while particular functionalities are shown in particular blocks by way of illustration, functionalities of different blocks and/or portions thereof may be combined, divided, and/or eliminated.

Still referring to FIG. 1, the second user interface 155b is located on a different side or face of the mobile terminal 100 than the first user interface 155a. For example, in some embodiments, the first user interface 155a may include the display 110a and the keyboard/keypad 105a located on a front of the mobile terminal 100 that is configured to face toward the user during mobile terminal operation, and the second user interface 155b may include the touch sensor 115b located on a back of the mobile terminal 100 that is configured to face away from the user during mobile terminal operation. As such, the controller 140 may be configured to perform mobile terminal functions responsive to detecting user inputs received via one or more of the first and/or second user interfaces 155a and 155b. Such mobile terminal functions may include, for example, entering or capturing a predetermined character and/or symbol, launching a program, dialing a phone number, navigating a menu, and/or changing a setting of the mobile terminal and/or an application thereof. In some embodiments, the second user interface 155b may be used in tandem with the first user interface 155a, and the relative positioning of first and second user interfaces 155a and 155b on the different faces of the mobile terminal 100 may be configured to enable one-handed operation of the mobile terminal 100, as discussed in detail below.

Figure 2B:
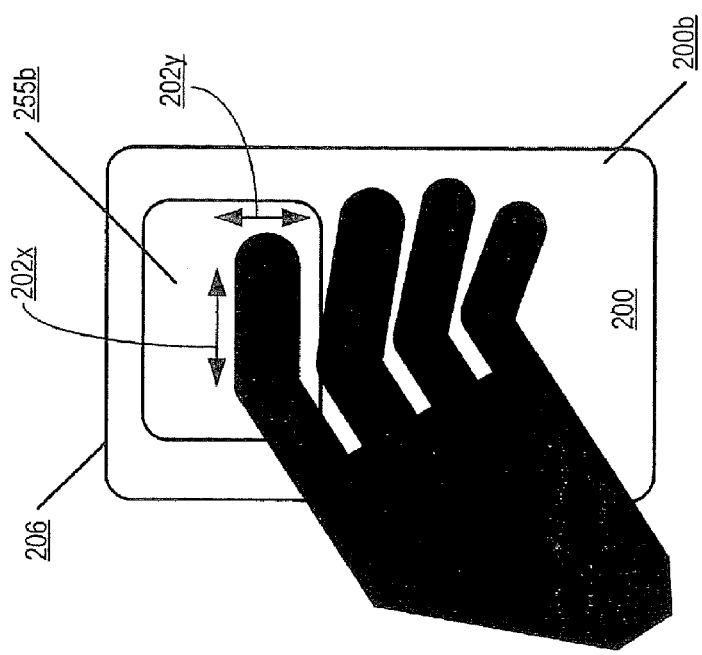
FIGS. 2A-2B are schematic diagrams illustrating front and back views of a mobile terminal including multiple user interfaces configured for one-handed operation in accordance with some embodiments of the present invention.
Figure 2A:
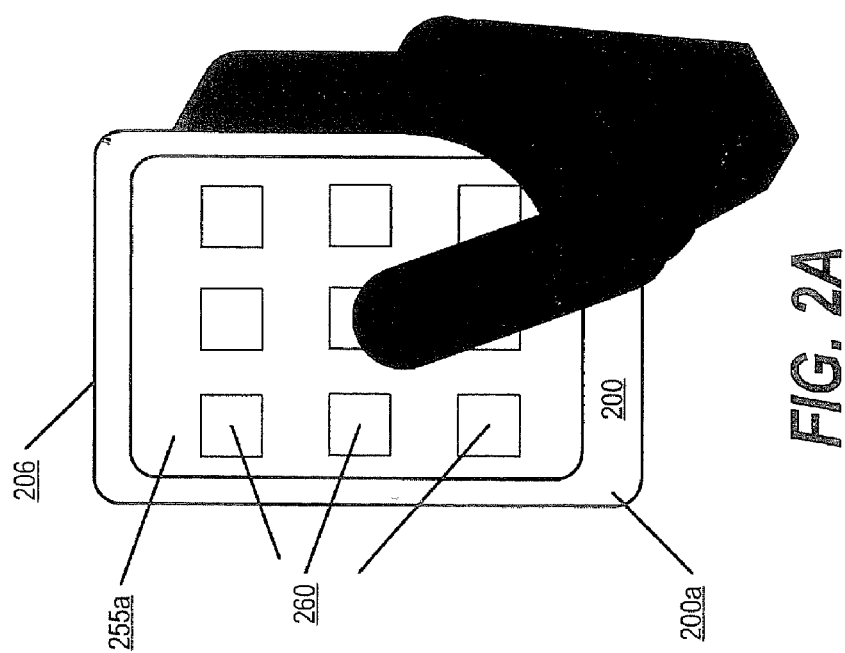

FIGS. 2A-2B illustrate a mobile terminal 200 including multiple user interfaces configured for one-handed operation in accordance with some embodiments of the present invention. In some embodiments, the mobile terminal 200 may correspond to the mobile terminal 100 of FIG. 1. Referring now to FIGS. 2A-2B, the mobile terminal 200 includes a mobile terminal housing 206, a first user interface 255a located on a front 200a of the mobile terminal housing 206, and a second user interface 255b located on a back 200b of the mobile terminal housing 206 opposite the front 200a. The first user interface 255a on the front 200a of the housing 206, which may include a display, is configured to face toward the user when operating the mobile terminal 200. The second user interface 255b on the back 200b of the housing 206 is configured to face away from the user during operation of the mobile terminal 200.

More particularly, as shown in FIG. 2A, the first user interface 255a is a touch-sensitive display, such as the touch-sensitive display 160a of FIG. 1, that is configured to receive a first user input on the front 200a of the mobile terminal housing 206. For example, the first user interface 255a may be configured to display a plurality of virtual 'buttons' 260, and may be configured to detect the touch and/or directional movement of a stylus or digit of a human hand (i.e., a thumb or finger) at the appropriate location(s) of the virtual buttons 260 as the first user input. Similarly, as shown in FIG. 2B, the second user interface 255b is a touch sensor, such as the touch sensor 115b of FIG. 1, configured to receive a second user input. The second user interface 255b may thereby be configured to detect the touch and/or directional movement of a stylus or digit of a human hand on the touch sensor on the back 200b of the mobile terminal 200 as the second user input.

Referring now to FIGS. 2A-2B, the second user interface 255b is configured to be used in tandem with the first user interface 255a. More particularly, a mobile terminal controller, such as the controller 140 of FIG. 1, is configured to detect and/or recognize combinations of the first and second user inputs received via the first and second user interfaces 255a and 255b, respectively. The first and second user inputs may be received substantially concurrently or within a given time period, which may be user-definable in some embodiments. The controller is further configured to map and/or associate the detected combinations of inputs to different mobile terminal functions, for example, based on a lookup table stored in a mobile terminal memory, such as the memory 130 of FIG. 1.

As such, in response to detecting the combination of the first and second inputs received via the first and second user interfaces 255a and 255b, the mobile terminal controller is configured to perform a mobile terminal function associated with the detected combination of user inputs. For example, where multiple alphanumeric characters and/or symbols are associated with each of the virtual 'buttons' 260 on the front 200a of the housing 206, the mobile terminal controller may be configured to capture and/or store a particular character and/or symbol responsive to detecting activation of one of the 'buttons' 260 on the first user interface 255a in conjunction with detecting a touch and/or direction of movement on the second user interface 255b along one or more axes 202x and/or 202y.

Other mobile terminal functions, inputs, and/or commands, such as launching programs, speed dialing particular phone numbers, navigating menus, and/or changing mobile terminal and/or application settings, may also be associated with particular combinations of the first and second user inputs. For example, a single tap on the first user interface 255a in combination with a sliding motion on the second user interface 255b along the axis 202y may be associated with a command to launch a media player application. Such functions may also be assigned to particular input combinations by the user in some embodiments. For instance, a user may associate a single tap on the first user interface 255a in combination with a heart-shaped motion on the second user interface 255b as a command to dial the phone number of a spouse and/or significant other, and parameters generated by the first and second user interfaces 255a and 255b responsive to receiving the first and second user inputs may be stored in the mobile terminal memory as being associated with the command to dial the phone number. Also, particular combinations of the first and second inputs received via the first and second user interfaces 255a and 255b may be associated with different functions for different application programs and/or different operating modes of the mobile terminal 200. For example, in the media player application, the single tap on the first user interface 255a in combination with the upward/downward sliding motion on the second user interface 255b along the axis 202y may be associated with volume control. The mapping of such functions to particular combinations of inputs may be stored within the mobile terminal's memory (for example, in lookup tables), and may be accessed by the controller responsive to receiving user inputs via the first and second user interfaces 255a and 255b.

Still referring to FIGS. 2A-2B, the relative positions of the first and second user interfaces 255a and 255b on different faces of the mobile terminal housing 206 may facilitate one-handed operation of the mobile terminal 200. More particularly, as shown in FIGS. 2A-2B, the first user interface 255a is on a front 200a of the housing 206, while the second user interface is on a back 200b of the housing 206 opposite the front 200a. As such, when the mobile terminal 200 is held in a user's hand, the first user interface 255a is operable by a user's thumb (FIG. 2A), while the second user interface 255b is accessible by one or more of the user's fingers on the same hand (FIG. 2B). The user's remaining fingers are used to hold the housing 206 of the mobile terminal 200 during operation. The mobile terminal 200 may, thereby, be operated with one hand based on combinations of user inputs received via the user's thumb on the first user interface 255a and via one or more of the user's fingers on the second user interface 255b.

For example, in one configuration, the 'buttons' 260 of the first user interface 255a may be configured to display a standard telephone keypad, including different numbers 0-9 and different groups of the letters A-Z associated with each of the 'buttons' 260. In a text messaging application program and/or mode of operation, the mobile terminal controller may, for example, detect activation of the '5' key (which is also associated with the letters 'J', 'K', and 'L') based on activation of the corresponding button of the first user interface 255a via the user's thumb, and may substantially concurrently detect a sliding motion to the left along the axis 202x based on detection of movement on the second user interface 255b via the user's index finger. As such, the mobile terminal controller may enter the letter "j" in the text messaging application program based on the detected combination, and "j" may be displayed on a screen associated with the first user interface 255a. Similarly, responsive to detecting activation of the '5' key on the first user interface 255a substantially concurrently with detecting a sliding motion to the right along the axis 202x on the second user interface 255b, the mobile terminal controller may enter the letter "l" in the text messaging application program. Likewise, the mobile terminal controller may enter the letter "k" responsive to detecting activation of the '5' key on the first user interface 255a and detecting a single tap and/or no input on the second user interface 255b. Also, a capitalization function may be associated with detected movement along the axis 202y in the text messaging application. For example, responsive to detecting activation of the '5' key on the first user interface 255a substantially concurrently with detecting a diagonal sweeping motion towards the right along the direction 202x and upward along the direction 202y on the second user interface 255b, the mobile terminal controller may enter a capital "L" in the text messaging application program.

The first and second user interfaces 255a and 255b may also be configured to receive multiple touch inputs and/or multiple directional inputs. For instance, the mobile terminal controller may be configured to detect a diagonal motion toward the right and upward followed by a diagonal motion toward the right and downward (i.e., to define a cross) on the second user interface 255b on the back 200b of the mobile terminal housing 206, and may be configured to enter the letter "x" responsive to the detected motions, similar to the Graffiti system of Palm, Inc. The mobile terminal controller may also be configured to detect a handedness (i.e., right-handed or left-handed) of the user based on the detected inputs and/or a based on a user selection, and as such, may re-map the association of particular functions with particular combinations of user inputs received via the first and second user interfaces 255a and 255b based on the handedness of the user.

In some embodiments, the second user interface 255b on the back 200b of the housing 206 may be a secondary interface that is not operable without first receiving an input via the first (e.g., primary) user interface 255a. The tandem use of the first and second user interfaces 255a and 255b may also reduce the likelihood of inadvertent inputs during handling of the mobile terminal 200. For example, a tap on the first user interface 255a may be used to initiate entry of a command, while a subsequent tap on the second user interface 255b may signify completion of the command. As such, the command may include multiple touch and/or direction-based inputs received between the first tap on the first user interface 255a and the second tap on the second user interface 255b, regardless of the time between inputs. In other embodiments, however, the second user interface 255b on the back 200b of the housing 206 may be used alone to input a user command, the results of which may be displayed on a display of the first user interface 255a on the front 200a of the housing.

Although FIGS. 2A-2B illustrate an exemplary mobile terminal including multiple user interfaces configured to facilitate one-handed operation, it will be understood that the present invention is not limited to such a configuration but is intended to encompass any configuration capable of carrying out operations described herein. For example, although illustrated as a touch sensitive display, the first user interface 255a may instead include a separate display and keypad, such as the display 110a and keyboard/keypad 105a of FIG. 1. As such, in some embodiments, the 'buttons' 260 may represent the physical buttons of the keypad. Also, while described above with respect to particular combinations of touch and/or direction of motion received via the first and second user interfaces 255a and 255b as being associated with particular functions, it is to be understood that other combinations of inputs may be associated with the particular functions and/or other functions in some embodiments. More generally, one or more user commands may be mapped to different combinations of two or more user inputs received via multiple user interfaces according to some embodiments of the present invention.

FIGS. 3A-3B illustrate an example configuration of a mobile terminal 300 including multiple user interfaces in accordance with some embodiments of the present invention. In some embodiments, the mobile terminal 300 may correspond to the mobile terminal 200 of FIG. 2. Referring now to FIGS. 3A-3B, the mobile terminal 300 includes a mobile terminal housing 306, a first user interface 355a including a touch-sensitive display 360a on a front 300a of the mobile terminal housing 306, a second user interface 355b including a touch sensor 315b on a back 300b of the mobile terminal housing 306, and a third user interface 355c including a dial 375 on a side face of the mobile terminal housing 306 between the front 300a and the back 300b. As such, when a user is holding the mobile terminal 300, the touch sensitive display 360a is operable by the user's thumb, while the touch sensor 315b and/or the dial 375 are accessible to and/or operable by one or more of the user's fingers, such as the user's index finger. Thus, each of the user interfaces 355a, 355b, and 355c are configured to receive a different user input. For example, the touch sensitive display 360a may be configured to detect one or more touches and/or directional motions thereon as a first user input. Similarly, the touch sensor 315b may be configured to detect one or more touches and/or directional motions thereon as a second user input. Likewise, the dial 375 may be configured to detect rotary activation thereof as a third user input. A mobile terminal controller within the housing 306, such as the controller 140 of FIG. 1, is configured to detect combinations of inputs received via the first, second, and/or third user interfaces 355a-355c, and is configured to perform particular mobile terminal functions associated with the detected combinations responsive to receiving the inputs, as discussed above with reference to FIGS. 2A-2B.

FIGS. 4A-4B illustrate an example configuration of a mobile terminal 400 including multiple user interfaces in accordance with other embodiments of the present invention. In some embodiments, the mobile terminal 400 may correspond to the mobile terminal 100 of FIG. 1. Referring now to FIGS. 4A-4B, the mobile terminal 400 includes a mobile terminal housing 406, a first user interface 455a including a display 410a and a keyboard/keypad 405a on a front 400a of the mobile terminal housing 406, a second user interface 455b including a touch sensor 415b on a back 400b of the mobile terminal housing 406, and a third user interface 455c including a dial 475 on a side face of the mobile terminal housing 406 between the front 400a and the back 400b. As such, when a user is holding the mobile terminal 300, the keyboard/keypad 405a is operable by the user's thumb, while the touch sensor 415b and/or the dial 475 are accessible to and/or operable by one or more of the user's fingers, such as the user's index finger. Thus, each of the user interfaces 455a, 455b, and 455c are configured to receive a different user input. For example, the keyboard/keypad 405a may be configured to detect depression of one or more buttons of the keyboard/keypad 405a as a first user input. The touch sensor 415b may be configured to detect one or more touches and/or directional motions on the touch sensor 415b as a second user input. The dial 475 may be configured to detect rotary activation thereof as a third user input. A mobile terminal controller within the housing 406, such as the controller 140 of FIG. 1, is configured to detect combinations of inputs received via the first, second, and/or third user interfaces 455a-455c, and is configured to perform particular mobile terminal functions, such as capturing input characters and/or symbols associated with the detected combinations, responsive to receiving the inputs, as discussed above with reference to FIGS. 2A-2B.

Although FIGS. 3A-3B and 4A-4B illustrate example configurations of mobile terminals including multiple user interfaces in accordance with some embodiments of the present invention, it will be understood that the present invention is not limited to such configurations, and may encompass any configuration including multiple user interfaces on different sides or faces of a mobile terminal. For example, in some embodiments, the third user interface may be implemented by a touch sensor on the side face of the mobile terminal between the front and back faces, rather than a dial. In other embodiments, the first user interface may include a non-touch-sensitive display on the front of the mobile terminal that is not configured to receive a user input, and as such, may be operable based on inputs received via the second and/or third user interfaces. More generally, while particular functionalities are shown in particular blocks by way of illustration, functionalities of different blocks and/or portions thereof may be combined, divided, and/or eliminated.

Computer program code for carrying out operations of devices discussed above with reference to FIGS. 1-4B may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is further described hereinafter with reference to a flowchart illustration of methods, mobile terminals, electronic devices, and/or computer program products in accordance with some embodiments of the invention. The flowchart further illustrates exemplary operations that may be performed by a mobile terminal having multiple user interfaces on different sides thereof in accordance with various embodiments of the present invention. It will be understood that each block of the flowchart, and combinations of blocks in the flowchart, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Figure 5:
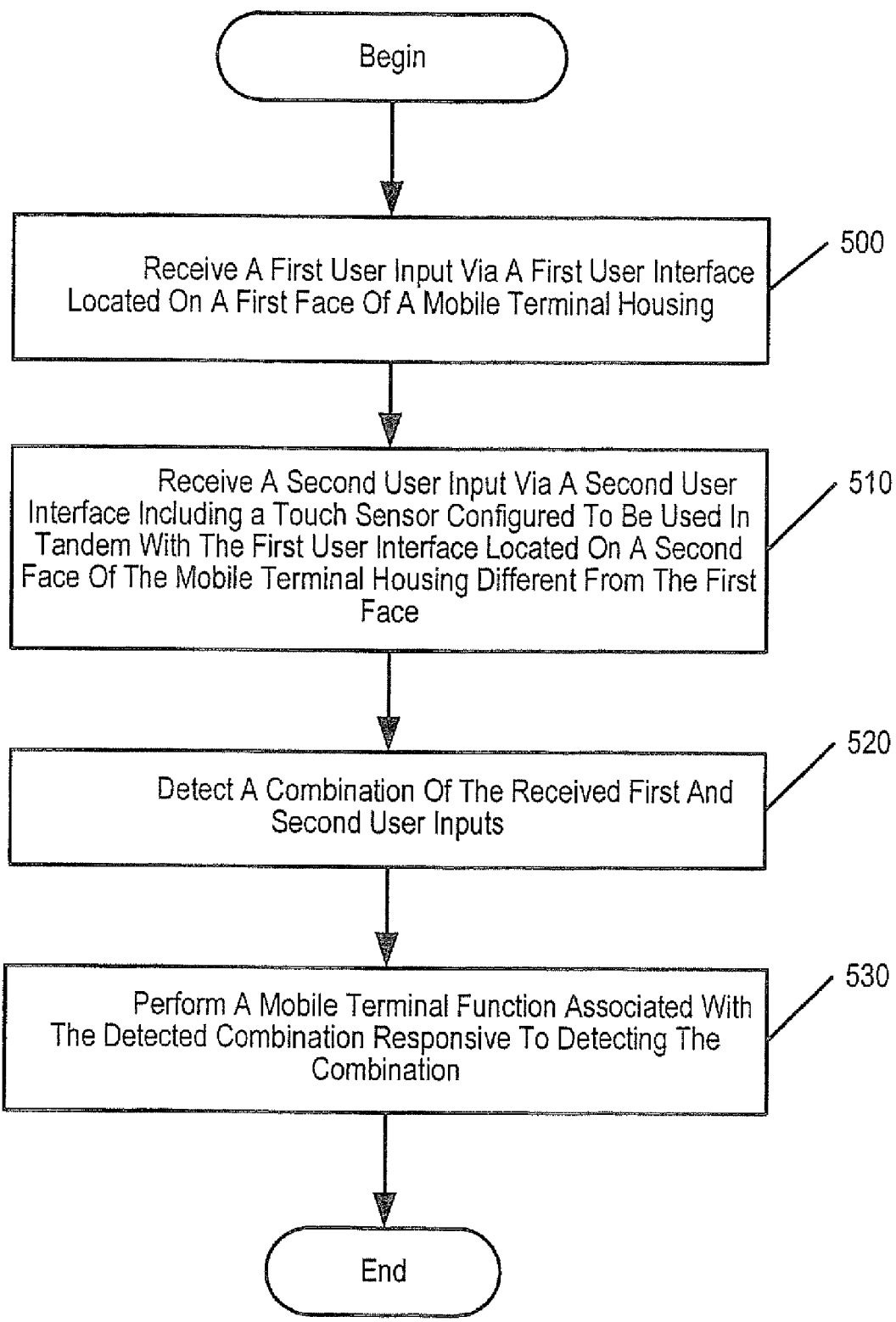
FIG. 5 is a flowchart illustrating example operations for operating a mobile terminal including multiple user interfaces in accordance with some embodiments of the present invention.

FIG. 5 is a flowchart illustrating example operations of a mobile terminal including multiple user interfaces on different sides or faces thereof in accordance with some embodiments of the present invention. Referring now to FIG. 5, operations begin when a first user input is received via a first user interface located on a first face of a handheld mobile terminal housing at Block 500. For example, the first user interface may be a keyboard/keypad, a touch sensor, and/or a touch sensitive display (i.e., a touch sensor and an associated display) located on a front of the mobile terminal housing configured to face toward the user during operation of the mobile terminal. Likewise, a second user input is received via a second user interface on a second face of the mobile terminal housing different from the first face at Block 510. The second user interface may be a touch sensor located on a back of the mobile terminal housing opposite the front that is configured to face away from the user during operation of the mobile terminal. The second user interface may be configured to be used in tandem with the first user interface. As such, the second user input may be received at block 510 substantially concurrently and/or within a predetermined time of receiving the first user input at Block 500. Also, the relative locations of the first and second user interfaces on opposite faces of the mobile terminal housing may facilitate one-handed operation of the mobile terminal. For example, a thumb input may be received via the first user interface at Block 500 as the first user input, and a finger input may be received via the second user interface at Block 510 as the second user input.

Still referring to FIG. 5, a combination of the first and second user inputs received via the first and second user interfaces is detected and/or recognized at Block 520. For example, the detected combination of user inputs received via the first and second user interfaces at Block 500 and Block 510, respectively, may be mapped to and/or associated with a particular mobile terminal function, for instance, based on a lookup table stored in the mobile terminal memory. Such a mobile terminal function may include launching a particular application or program, entering/capturing a particular character and/or symbol, dialing a particular phone number, moving an on-screen cursor, and/or changing a particular setting of the mobile terminal and/or an application thereof. Desired combinations of user inputs may also be assigned to particular mobile terminal functions by the user. For example, in a settings menu, parameters generated by the first and second user interfaces responsive to receiving the first and second user inputs may be stored in a memory of the mobile terminal and associated with a particular function based on a user assignment.

Accordingly, the mobile terminal function corresponding to the detected combination of the first and second user inputs is performed at Block 530. For example, responsive to receiving a tap on a '5' key of the first user interface (which is also associated with the letters 'J', 'K', and 'L') at Block 500 in conjunction with receiving a sliding motion to the right on the second user interface at Block 510 when executing a text messaging application on the mobile terminal, a user command to input an "L," in the text messaging application is recognized based on the detected combination at Block 520 and entered/captured in the text messaging application at Block 530 responsive to the detected combination of user inputs. In some embodiments, the second user interface on the back of the mobile terminal housing may be a secondary interface that is not configured to be used without the first user interface, and as such, no mobile terminal functions may be performed responsive to receiving the second user input without receiving the first user input. In other embodiments, however, a mobile terminal function may be performed at Block 530 responsive to detecting a corresponding input from only one of the first or second user interfaces.

The flowchart of FIG. 5 illustrates the architecture, functionality, and operations of embodiments of hardware and/or software in electronic devices, such as mobile terminals, according to some embodiments of the present invention. In this regard, each block represents a module, segment, or portion of code, which comprises one or more executable instructions for implementing the specified logical function(s). It should also be noted that in other implementations, the function(s) noted in the blocks may occur out of the order noted in FIG. 5. For example, two blocks shown in succession may, in fact, be executed substantially concurrently or the blocks may sometimes be executed in the reverse order, depending on the functionality involved.

Accordingly, some embodiments of the present invention may enable one-handed and/or blind operation of mobile terminals by employing multiple touch sensors on different sides or faces of the mobile terminal that are configured to be used in combination. More particularly, in some embodiments, a touch-sensitive display is provided on the front of the mobile terminal and a touch sensor is provided on the back of the mobile terminal. The touch sensitive display and the touch sensor are provided in relative positions such that the touch sensitive display is operable by a thumb and the touch sensor is operable by an index finger of the same hand, to provide a novel one-handed interface structure.

In the drawings and specification, there have been disclosed exemplary embodiments of the invention. However, many variations and modifications can be made to these embodiments without substantially departing from the principles of the present invention. Accordingly, although specific terms are used, they are used in a generic and descriptive sense only and not for purposes of limitation, the scope of the invention being defined by the following claims.

That which is claimed:

1. A mobile terminal, comprising:
a housing sized and configured to be held in a user's hand;
a first user interface located on a first face of the housing and configured to receive a first user input, wherein the first user interface includes a physical or virtual button;
a second user interface located on a second face of the housing different from the first face and configured to receive a second user input, the second user interface comprising a touch sensor configured to be used in tandem with the first user interface, wherein the second user interface is positioned on the housing relative to the first user interface to enable one-handed operation of the mobile terminal; and
a controller within the housing and coupled to the first and second user interfaces, wherein the controller is configured to detect a combination of the received first and second user inputs and perform a mobile terminal function associated with the detected combination responsive to detecting the combination, and wherein the controller is configured to perform no mobile terminal functions responsive to detecting receipt of the second user input without receipt of the first user input such that the second user interface is not configured to be used without the first user interface,
wherein the button includes at least three alphanumeric characters and/or symbols associated therewith, and wherein:
the controller is configured to enter a first one of the associated characters and/or symbols responsive to detecting activation of the button on the first user interface as the first user input;
the controller is configured to enter a second one of the associated characters and/or symbols responsive to detecting activation of the button on the first user interface as the first user input in combination with detecting a first direction of motion in on the second user interface as the second user input; and
the controller is configured to enter a third one of the associated characters and/or symbols responsive to detecting activation of the button on the first user interface as the first user input in combination with detecting a second direction of motion different from the first direction on the second user interface as the second user input.

2. The mobile terminal of claim 1, wherein the second face comprises a back of the mobile terminal housing configured to face away from a user during operation of the mobile terminal.

3. The mobile terminal of claim 2, wherein the first face comprises a front of the mobile terminal housing opposite the back and configured to face toward the user during operation of the mobile terminal.

4. The mobile terminal of claim 1, wherein the controller is configured to detect the combination based on first and second user inputs that are received substantially concurrently via the first and second user interfaces, respectively.

5. The mobile terminal of claim 1, wherein the first user interface comprises a keypad including the physical button.

6. The mobile terminal of claim 1, wherein the first user interface comprises a second touch sensor.

7. The mobile terminal of claim 1, wherein the controller is configured to determine a handedness of the user and perform the function responsive to detection of a different combination of the first and second user inputs based on the handedness of the user.

8. A method of operating a handheld mobile terminal, the method comprising:
receiving a first user input via a first user interface located on a first face of a mobile terminal housing, wherein the first user interface includes a physical or virtual button and/or receiving a second user input via a second user interface located on a second face of the mobile terminal housing different from the first face, the second user interface comprising a touch sensor configured to be used in tandem with the first user interface, wherein the second user interface is positioned on the housing relative to the first user interface to enable one-handed operation of the mobile terminal;
performing a mobile terminal function associated with a detected combination of the first and second user inputs responsive to receiving the first and second user inputs; and performing no mobile terminal functions responsive to receiving the second user input without receiving the first user input, wherein the button includes at least three alphanumeric characters and/or symbols associated therewith, and wherein performing the mobile terminal function further comprises:

entering a first one of the associated characters and/or symbols responsive to detecting activation of the button on the first user interface as the first user input;

entering a second one of the associated characters and/or symbols responsive to detecting activation of the button on the first user interface as the first user input in combination with detecting a first direction of motion on the second user interface as the second user input; and entering a third one of the associated characters and/or symbols responsive to detecting activation of the button on the first user interface as the first user input in combination with detecting a second direction of motion different from the first direction on the second user interface as the second user input.

9. The method of claim 8, further comprising the following when the mobile terminal is held in a user's hand:

operating the first user interface responsive to a thumb of the user's hand to provide the first user input; and operating the second user interface responsive to a finger of the same hand to provide the second user input and enable one-handed operation of the mobile terminal.

10. The method of claim 9, wherein the second face comprises a back of the mobile terminal housing configured to face away from a user during mobile terminal operation.

11. The method of claim 10, wherein the first face comprises a front of the mobile terminal housing opposite the back and configured to face toward the user during mobile terminal operation.

12. The method of claim 8, further comprising:

detecting the combination of the first and second user inputs responsive to receiving the first and second user inputs substantially concurrently via the first and second user interfaces, respectively.

13. The method of claim 8, wherein the first user interface comprises a second touch sensor.

14. A non-transitory computer program product for operating a handheld mobile terminal, the computer program product comprising a computer readable storage medium including computer readable program code embodied therein, wherein, when executed on at least one processor, the computer readable program code causes the at least one processor to:

receive a first user input via a first user interface including a physical or virtual button located on a first face of a mobile terminal housing and/or receive a second user input via a second user interface located on a second face of the mobile terminal housing different from the first face, the second user interface comprising a touch sensor configured to be used in tandem with the first user interface, wherein the second user interface is positioned on the housing relative to the first user interface to enable one-handed operation of the mobile terminal;

perform a mobile terminal function associated with a detected combination of the first and second user inputs responsive to receiving the first and second user inputs; and perform no mobile terminal functions responsive to receiving the second user input without receiving the first user input such that the second user interface is not configured to be used without the first user interface wherein the button includes at least three alphanumeric characters and/or symbols associated therewith, and wherein the computer readable program code further causes the at least one processor to:

enter a first one of the associated, characters and/or symbols responsive to detecting activation of the button on the first user interface as the first user input;

enter a second one of the associated characters and/or symbols responsive to detecting activation of the button on the first user interface as the first user input in combination with detecting a first direction of motion on the second user interface as the second user input; and enter a third one of the associated characters and/or symbols responsive to detecting activation of the button on the first user interface as the first user input in combination with detecting a second direction of motion different from the first direction on the second user interface as the second user input.

\* \* \* \* \*

UNITED STATES PATENT AND TRADEMARK OFFICE
CERTIFICATE OF CORRECTION

PATENT NO. : 8,395,584 B2  
APPLICATION NO. : 12/017789  
DATED : March 12, 2013  
INVENTOR(S) : Jeffrey Jason Griffin Page 1 of 1

It is certified that error appears in the above-identified patent and that said Letters Patent is hereby corrected as shown below:

On Title Page:  
Item (73) Assignees, correct:

"Sony Corporation, Lund (SE); Sony Mobile Communications AB, Lund (SE)"

to read:

-- Sony Corporation, Tokyo (JP); Sony Mobile Communications AB, Lund (SE) --

Signed and Sealed this  
Eighth Day of April, 2014

Michelle K. Lee  
*Deputy Director of the United States Patent and Trademark Office*